United States Patent [19]
Sasayama

[11] 3,939,811
[45] Feb. 24, 1976

[54] IGNITION APPARATUS FOR INTERNAL COMBUSTION ENGINE

[75] Inventor: Takao Sasayama, Hitachi, Japan

[73] Assignee: Hitachi, Ltd., Japan

[22] Filed: Apr. 10, 1974

[21] Appl. No.: 459,800

[52] U.S. Cl. .......................... 123/117 R; 123/117 D
[51] Int. Cl.² ........................................... F02P 5/04
[58] Field of Search .................... 123/117 R, 117 D

[56] References Cited
UNITED STATES PATENTS

| | | | |
|---|---|---|---|
| 3,454,871 | 7/1969 | Nolting | 123/117 R |
| 3,521,611 | 7/1970 | Finch | 123/117 R |
| 3,738,339 | 6/1973 | Huntzinger et al. | 123/117 R |
| 3,749,073 | 7/1974 | Asplund | 123/117 R |
| 3,757,755 | 9/1973 | Carner | 123/117 R |
| 3,791,356 | 2/1974 | Saita | 123/117 R |

*Primary Examiner*—Wendell E. Burns
*Assistant Examiner*—Joseph A. Cangelosi
*Attorney, Agent, or Firm*—Craig & Antonelli

[57] ABSTRACT

An ignition apparatus for supplying ignition energy of high voltage to the ignition plugs at the optimum ignition timing required of the internal combustion engine is disclosed, in which an electric or electronic adder in a control circuit begins to be energized after a time delay sufficient at least for completion of one ignition starting from the time of generation of at least one rotational angle signal occuring prior to the optimum ignition timing, the accumulating operation continues until the generation of the next rotational angle signal when a subtractor begins subtracting operation, and the next ignition is effected by causing electromagnetic induction in the ignition coils when the result of subtraction reaches a predetermined value. In the process, the length of the delay time, the accumulating and subtracting rate as relative to time and a reference value to be compared with the result of subtraction are maintained constant without regard to the engine rotational speed thereby to change the maximum amplitude at the time of change-over between addition and subtraction in accordance with the engine rotational speed, so that the time required for the result of subtraction to reach the predetermined reference is changed for regulation of ignition timing.

20 Claims, 14 Drawing Figures

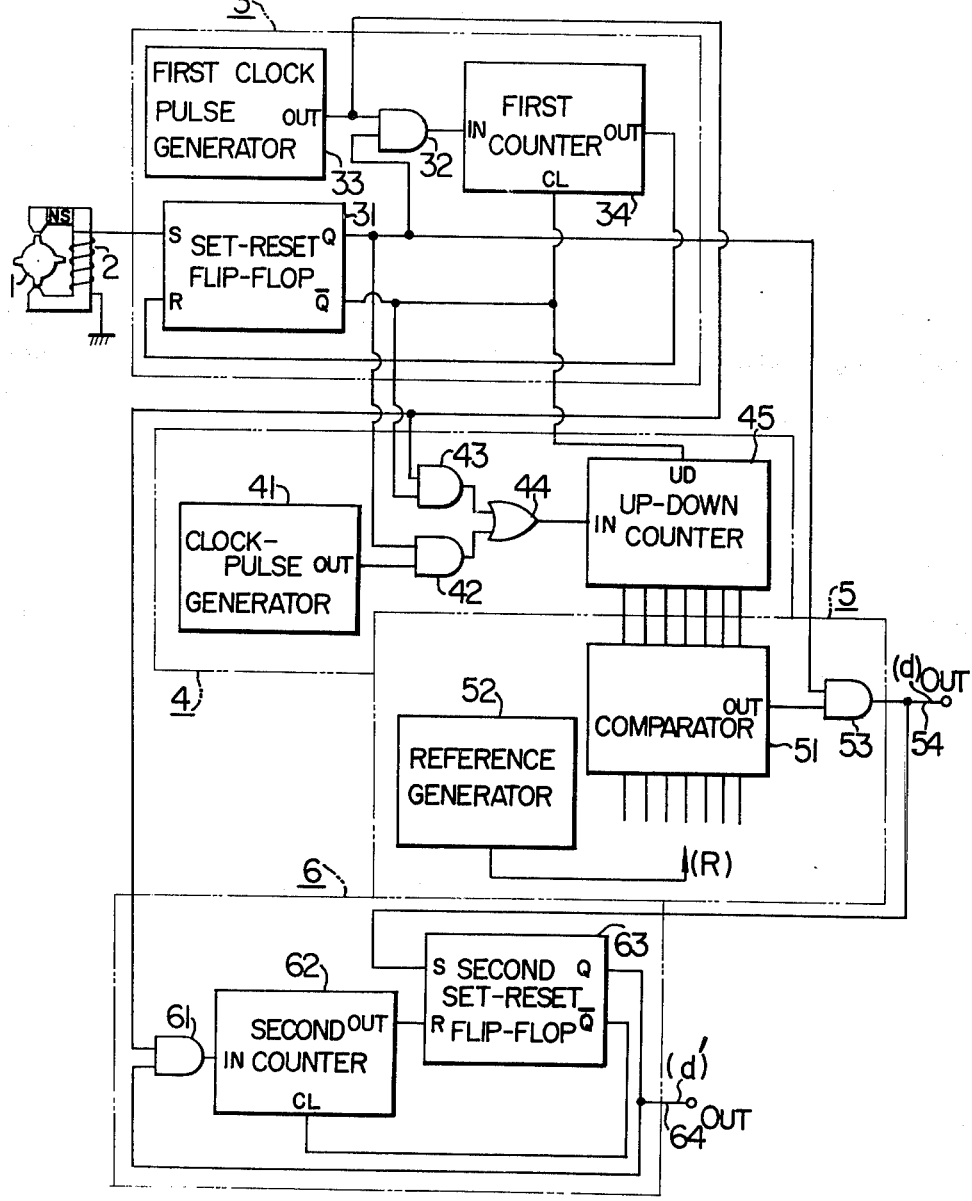

(a) PICKUP SIGNAL
(b) OUTPUT SIGNAL FROM 14
(c) VOLTAGE ACROSS CAPACITOR
(d) OUTPUT SIGNAL FROM 18
(e) CURRENT IN 20a

IGNITION APPARATUS FOR INTERNAL COMBUSTION ENGINE

The present invention relates to an ignition apparatus for the internal combusion engine or more in particular to an ignition apparatus in which ignition timing as relative to engine speed is capable of being advanced or delayed at will in an electrical and electronical way.

Generally, the ignition of the internal combustion engine is effected by the use of spark discharge of ignition plugs. The ignition timing, that is, the time at which a high voltage is applied to the ignition plugs for starting ignition has an important effect on the output characteristics of the engine and on the composition of exhaust gas. The optimum ignition timing for an engine varies with the rotational speed and load condition of the engine, each engine having its own optimum ignition timing.

In order to achieve the above-mentioned angle-lead characteristics, the conventional ignition apparatus includes a centrifugal angle advancing device using a centrifugal governor or a mechanical angle advancing device such as a vacuum angle advancing device using a diaphragm.

In view of the recent demand for higher engine performance, it is especially necessary to achieve optimum angle-lead characteristics for the purpose of air pollution control, thus purifying exhaust gas by optimum ignition. The conventional mechanical method to control ignition timing results in the great complication of the construction of the ignition apparatus on one hand and lacks the required reliability in accuracy on the other. As a result, fine adjustment is required, lowering the practical value of the apparatus.

In an effort to overcome such a problem, an electrical-electronic method for controlling the ignition timing was developed. It took the form of what is called the electronic angle advancing device.

In such a device, a disc is secured to a crank shaft or a shaft rotating at a predetermined speed ratio with respect to the crank shaft. A light source and a photoelectric pickup such as a phototransistor are disposed on opposedly to each other on both sides of the disc with a plurality of minute holes along its periphery. With the rotation of the disc, light beams interrupted continually by the rotation of the disc are converted into electrical pulses through the holes and output pulses from the photoelectric pickup are shaped into rectangular pulses through a trigger circuit, which rectangular pulses are again shaped by another electrical circuit into current in stepped form. This electrical circuit delivers an output pulse when the current in stepped form reaches a certain level, which pulse is used to energize an ignition circuit. Further, a bias current varying in proportion to the engine speed is superimposed on the current in stepped form, so that the time when the above-mentioned certain level is reached by the stepped current is delayed or advanced by the amount of change of the bias current in accordance with engine speed, thus adjusting ignition timing.

The above-described apparatus which performs every automatic angle advancing operation electronically for controlling ignition timing assures more accurate operation and is longer in service life than the mechanical automatic angle advancing device. Moreover, it offers the ease with which ignition timing is electrically controlled. In addition, the absence of any contact breaker or other mechanical contacts eliminates time and labor so far required for lapping of the contacts or other machine adjustment.

In the above-mentioned method, the resolution of a detector for detecting the rotational angle is determined by the number of holes bored in the disc, so that achievement of high accuracy of rotational angle requires minute holes provided at very short intervals. Technical limitations are, however, confronted in machining such small holes and passing light beams therethrough. Especially, it is extremely difficult to expect its successful operation on the automobile which jolts and bumps so often, thus making it impossible to achieve required precision.

The foregoing method employs separate detectors for detecting a rotational angle signal and a rotational speed signal. If only one signal is used for control purposes, one instead of two detectors is enough for detection of the signal, resulting in reduction in cost and elimination of variations of accuracy which otherwise might occur due to detection errors.

Accordingly, it is an object of the present invention to provide an ignition apparatus for the internal combustion engine which is capable of generating ignition energy at an optimum time point as relative to a wide variety of speed changes of the engine.

Another object of the invention is to provide an ignition apparatus for the internal combustion engine which is capable of determining an optimum ignition time point as relative to a wide variety of speed changes of the engine in response to an output signal of a detector representative of an engine speed.

Still another object of the invention is to provide an ignition apparatus for the internal combustion engine which, if used as an ignition apparatus of induction type, has the same ignition energy for the same engine speed in spite of any variations in source voltage.

According to one aspect of the present invention, a first signal representative of a rotational angle of the engine energizes means for producing a predetermined time interval, and upon completion of operation of such means another means for making additions and producing a sum at a predetermined gradient of time lapse is energized until arrival of a second signal representative of an engine speed. Also, means are provided which begin to make subtraction from the above-mentioned sum at a predetermined gradient of time lapse upon application thereto of the second signal, so that when the result of the subtraction reaches a predetermined value, a signal for controlling the ignition circuit is produced.

According to another aspect of the present invention, the time interval from generation of one rotational angle signal to that of next rotational angle signal is used as a rotational speed signal for the engine.

Still another feature of the invention lies in that the rise of the output of the detector makes up a rotational angle signal while on the other hand the time interval between the rise and fall of the same is used as a rotational speed signal.

A further feature of the invention resides in the fact that the signal for controlling the ignition circuit is inversely proportional to the variations of the source voltage.

The above and other objects, features and advantages will be made apparent by the detailed description taken in conjunction with the accompanying drawings, in which:

FIG. 5 is a diagram showing an example of circuit arrangement which is the result of digitalizing the circuit of FIG. 4;

Figure 1:
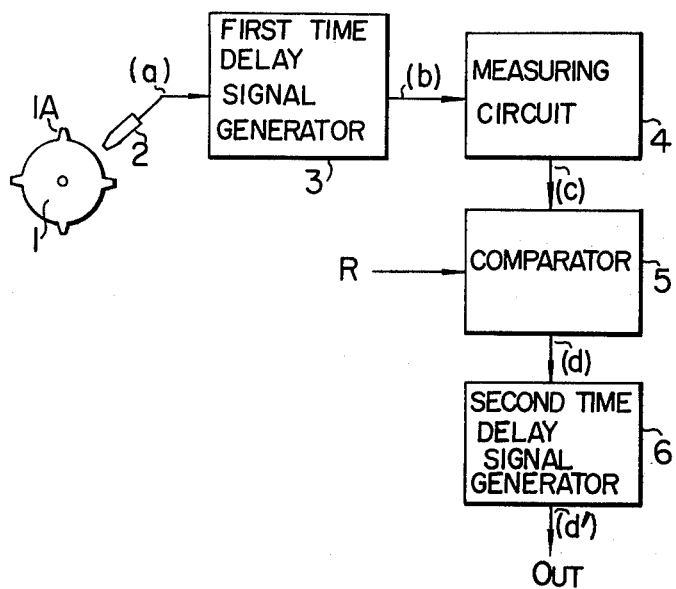
FIG. 1 is a block diagram showing the operating principle of an ignition apparatus according to the present invention.

In the block diagram of FIG. 1 showing the operating principle of the ignition apparatus according to the present invention, reference numeral 1 shows a rotor rotating synchronously with the crank shaft of the engine which has a mark 1A for every ignition cycle, the shown rotor being for the four-cylinder internal combustion engine involving four times of ignition for each rotation of the rotor 1. Numeral 2 shows a pickup for detecting the mark 1A of rotor 1 and generating a rotational angle signal as shown in (a) of FIG. 3, which pickup specifically may employ electromagnetic or photoelectric means. Numeral 3 shows a first delay signal generator circuit for generating a signal as shown in (b) of FIG. 3 which is lagging behind the rotational angle signal by a predetermined time interval $T_1$. Numeral 4 shows a measuring circuit which as shown in (c) of FIG. 3 measures the time interval from the end of a delay pulse to the next rotational angle pulse by a predetermined coefficient $m_1$ and at the same time produces an output signal representing a time interval measured by the predetermined coefficient $-m_2$ as from the rotational angle pulse. This measuring circuit specifically comprises a capacitor or up-down counter. Numeral 5 shows a comparator circuit which produces an output signal as shown in (d) of FIG. 3 when the output from the measuring circuit 4 reaches the predetermined level R. Numeral 6 shown a second time delay signal generator circuit excited by the output from the comparator circuit 5, which is de-energized after the lapse of a predetermined time $T_2'$ as shown in (d') of FIG. 3.

Time point $\theta$ when output $T_2$ is produced from the comparator circuit 5 or the rise time of the output from the second delay time signal generator circuit has the following relationship with the repetition period T of the rotational angle signal:

$$\theta = \left(\frac{T - T'}{T}\right) \cdot \frac{\pi}{4} \quad (1)$$

where $T'$ is the time interval from the generation of the rotational angle signal to the generation of the output from the comparator circuit.

Figure 3:
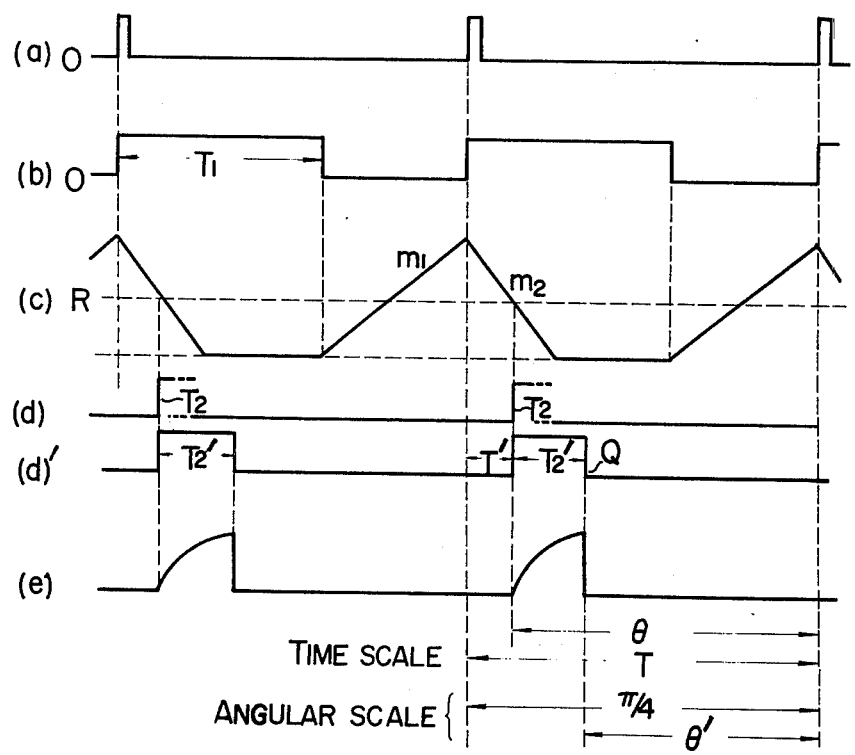
FIG. 3 shows waveforms for explaining the ignition apparatus according to the invention.

As will be apparent from (c) of FIG. 3,
$$m_1(T - T_1) - m_2 \cdot T' = R \quad (2)$$

Erasing $T'$ from equations (1) and (2) above, $\theta$ as relative to the position of generation of the rotational angle signal is expressed as:
$$\theta = a + bf \quad (3)$$

where $f$ is the repetition frequency of the rotational angle signal or $1/T$, $a$ is $$\left(1 - \frac{m_1}{m_2}\right) \cdot \frac{\pi}{4},$$

and $b$ is $$\left(\frac{m_1 \cdot T_1 + R}{m_2}\right) \cdot \frac{\pi}{4}.$$

Since $m_1$, $m_2$, $T_1$ and $R$ are constant, the timing $\theta$ when the output $T_2$ is produced from the comparator circuit 5 or the rise time of the output from the second time delay signal generator circuit has the straight-line relation with the repetition frequency $f$ of the rotational angle signal. Therefore, it is possible, by using this $\theta$ as the ignition time point, to advance or delay the ignition timing linearly with respect to rotational speed. Since the above-mentioned constants can be determined at will in a manner suitable for the optimum characteristics of the engine, optimum regulation of ignition timing can be achieved only by the rotational angle signal.

Figure 2A:
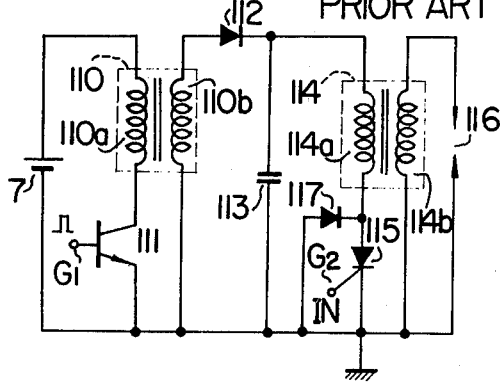
FIG. 2A shows a circuit configuration of the well known ignition apparatus of capacitor discharge type.
Figure 2B:
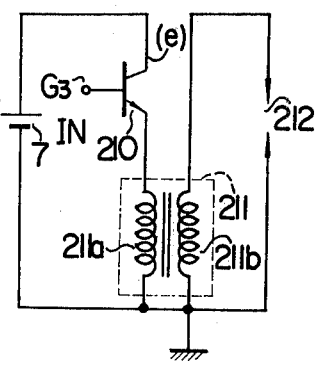
FIG. 2B is a diagram showing a circuit configuration of the well known ignition apparatus of induction type.

The fundamental circuit configurations of the well known ignition apparatus of capacitor discharge type and ignition apparatus of induction type are shown respectively in Fig. 2A and FIG. 2B. In FIG. 2A, reference numeral 7 shows a battery power supply which makes up a closed circuit together with the primary winding 110a of a transformer 110 and a breaker comprising a transistor 111 in series with the primary winding 110a. As long as the breaker 111 is in the energized state, electromagnetic energy is stored in the primary winding 110a, whereas a high voltage is induced in the secondary winding 110b simultaneously with the breaking of transistor 111 due to the electromagnetic induction caused in the transformer. This voltage causes the charging of the capacitor 113 forming a closed circuit together with the secondary winding 110b and diode 112. Another closed circuit is formed by this capacitor 113 together with the primary coil 114a of the ignition coils 114 and a switch 115. When the switch 115 is energized at the ignition timing, electric charges stored in the capacitor 113 are released and applied to the ignition coils 114, while an ultra high voltage is induced in the secondary coil 114b by the electromagnetic induction, thereby generating an ignition spark in the ignition plug 116 connected to the secondary coil 114b. Reference numeral 117 shows a diode for promoting the opposite-polarity discharge of the capacitor 113, which diode may be eliminated from the circuit as desired.

In this type of ignition apparatus, the ignition timing can be adjusted by changing the discharge timing of the capacitor 113 as a result of the controlling of the time of energization of the switch 115. Therefore, if the ignition apparatus of FIG. 1 according to the invention is combined with the circuit of FIG. 2A in such a manner that the output of the comparator 5 or the rise portion of the output from the second delay time generator circuit 6 is applied to the input terminal "IN" of the switch 115, the capacitor 113 discharge automatically at optimum ignition time point in accordance with the engine speed.

Referring to FIG. 2B, reference numeral 210 shows a switch which, together with the battery power supply 7 and the ignition coils 211, makes up a closed circuit. In this case, the electromagnetic energy stored in the primary coil 211a while the switch is in energized state is converted into a high voltage induced in the secondary coil 211b of the ignition coil 211, which high voltage is used to generate an ignition spark on the ignition plug 212.

According to the above-mentioned ignition apparatus, ignition timing is adjustable by controlling the cut-off time of the switch 210. Therefore, if the output from the ignition apparatus according to the present invention is used as a cut-off signal for the switch 210, it is possible to effect optimum ignition as in the above-mentioned ignition apparatus of capacitor type.

Since it is uneconomical to apply battery power to the ignition coils all the time, it preferably begins to be applied a little before the optimum ignition time. For this purpose, the output $T_2'$ from the second delay time signal generator circuit 6 may be taken advantage of. In other words, an arrangement is made in such a manner that the switch 210 is not energized until application thereto of an output from the comparator circuit 5, that the energization period of the switch 210 is equal to a time interval determined by the second delay time $T_2'$, that such a time interval is sufficiently long to store electric energy in the ignition coils 211, and that at the fall time after the lapse of time $T_2'$, the switch 210 is cut off while at the same time causing electromagnetic induction in the ignition coils.

In this case, the ignition time is expressed as $\theta'$ in FIG. 3. Like equations (1) to (3) above, the ignition time point $\theta'$ has the relationship below with the rotational angle signal.

$$\theta' = \left[\frac{T - (T' + T_2')}{T}\right] \cdot \frac{\pi}{4} \quad (1)'$$

where similar symbols denote similar factors in (1) to (3).

It will be obvious from (c) of FIG. 3 that
$$m_1(T - T_1) - m_2 \cdot T' = R \quad (2)$$
By erasing $T'$ from equations (1)' and (2) above, $\theta'$ as relative to the point of generation of the rotational angle signal is expressed as
$$\theta' = a + b'f \quad (3)$$
where $f$ is the repetition frequency of the rotational angle signal or $1/T$, $a$ is $$\left(1 - \frac{m_1}{m_2}\right) \cdot \frac{\pi}{4},$$

and $b'$ is $$\left(\frac{m_1 \cdot T_1 + R}{m_2} - T_2'\right) \cdot \frac{\pi}{4}.$$

Since $m_1, m_2, T_1, R$ and $T_2'$ are made constant, ignition time $\theta'$ may be changed linearly with the repetition frequency $f$ of the rotational angle signal as in the foregoing case, so that, by selecting an optimum relation between the constants suitable to engine characteristics, optimum control is made possible of the ignition time based on only the rotational angle signal as in the aforementioned case.

In the present case, the time interval of the voltage applied to the primary winding 211a of the ignition coils 211, that is, the second delay time interval $T_2'$ is not dependent on the rotational speed, so that the electromagnetic energy stored in the ignition coils is kept stable, thereby making it possible to produce a stable ignition spark output for a wide range of speed changes.

An actual example of the apparatus will be now explained with reference to FIG. 4. In the drawing, reference numeral 1 shows a rotor of magnetic material having four protruded marks 1a. Numeral 2 shows a pickup comprising a permanent magnet 2a at the center, iron core 2b with its ends opposed to the protruded marks 1a, a power generating coil 2c wound on the iron core 2b, a circuit for grounding an end of the power generating coil 2c, and resistor 2d and diode 2e through which the other end of the coil 2c is connected to a delay signal generator circuit 3. The delay signal generator circuit 3 including a monostable multivibrator comprises a normally cut-off NPN transistor 3a with its emitter grounded and with its collector connected to a positive power line 11 through the cathode and anode of the diode 3b and the resistor 3c. The collector of the transistor 3a is further connected through a resistor 3d to the base of a PNP transistor 4a for issuing a subtraction command to the measuring circuit 4, whereas the base of the normally cut-off NPN transistor 3a is connected to the cathode of the diode 2e on one hand and to the collector of the normally-energized NPN transistor 3f through the resistor 3e on the other. The transistor 3f has an emitter connected to the base of NPN transistor 4b for issuing an add command to the measuring circuit 4, a collector connected through a resistor 3g to the power line 11 and a base connected through a capacitor 3h to the anode of the diode 3b on one hand and to the power line 11 through a resistor 3i on the other. The measuring circuit 4 comprises a charge-discharge or accumulate-subtract capacitor and a couple of constant-current circuits. The capacitor 4c has a terminal thereof grounded and the other terminal thereof commonly connected to the collectors of the transistors 4d and 4e. The transistor 4d is a PNP transistor making up a constant current circuit and has an emitter connected to the power line 11 through resistor 4f and a base connected to the terminals of voltage-dividing resistors 4g and 4h inserted in series between power line 11 and the ground. The transistor 4a has its emitter and collector connected in parallel with the voltage-dividing resistor 4g. The transistor 4e, which is an NPN transistor making up a constant-current circuit for discharge purpose, has an emitter grounded through a resistor 4i and a base connected to the voltage-dividing terminals of voltage-dividing resistors 4j and 4k connected in series between the power line 11 and the ground. The transistor 4b has its emitter and collecter connected in parallel to the voltage-dividing resistor 4k. The comparator circuit 5 comprises a couple of PNP transistors 5a and 5b the emitters of which are connected through a common resistor 5c to the power line 11. The base of transistor 5a is connected through the resistor 5d to the ungrounded terminal of the capacitor 4c, while the base of the transistor 5b is connected to the voltage-dividing terminals of the voltage-dividing resistors 5e and 5f inserted in series between the power line 11 and the ground, the collector of the same transistor being grounded. The second delay time signal generator circuit 6 comprises a monostable circuit including NPN transistors 6a and 6b, resistors 6c, 6d and 6e and capacitor 6f. The emitter of the transistor 6a is grounded, the base thereof connected to the collector to the transistor 5a in the comparator circuit 5, and the collector thereof connected through the resistor 6c to the power line 11 on one hand and to the base of transistor 6b through the capacitor 6f. The transistor 6b has an emitter grounded, a base connected to the power line 11 through the resistor 6d and a collector connected to the power line 11 through the resistor 6e.

In the above-described circuit arrangement, a magnetic closed circuit is formed by the permanent magnet 2a, iron core 2b and the rotor 1 thereby to increase the magnetic fluxes in the iron core 2b when the marks 1a of the rotor 1 come to a position opposite to the ends of the iron core 2b of the pickup 2. A voltage in accordance with the amount of variations in the magnetic fluxes is induced in the power generating coil 2c, which voltge triggers the delay signal generator circuit 3, that is, the monostable multivibrator, energizing the transistor 3a and cutting off the transistor 3f. Prior to the occurrence of this state, the transistors 3a and 3f were OFF and ON respectively, and accordingly the transistors 4a and 4b in the measuring circuit 4 were also OFF and ON respectively, with the result that the transistor 4d was ON thereby to maintain the capacitor 4c in a charged state at constant current. The changing of the monostable multivibrator to the other state, however, causes the transistors 4a and 4b to be turned on and off respectively, so that the capacitor 4c effects a constant-current discharge through the transistor 4e. If the voltage across the capacitor 4c is so controlled as to exceed the base potential R of the transistor 5b dependent on the voltage-dividing resistors 5e and 5f in the process of its charging, both the transistor 5a and the transistor 6a in the second delay time generator circuit 6 are in the OFF state. As a result, the transistor 6b is forward-biased into the ON state through the resistor 6d, while the capacitor 6f is charged at the shown polarity. If the voltage across the capacitor 4c of the measuring circuit 4 is decreased below the predetermined potential R as shown in (c) of FIG. 3 in the process of its discharge, however, the transistors 5a and 5b of the comparatar circuit 5 are turned off. As a result, the transistor 6a of the second time delay generator circuit 6 is energized and the positive terminal of the capacitor 6f is grounded, so that the transistor 6b is inversely biased by the voltage of the capacitor 6f and turned off. The potential at the output terminal 6g is raised to the potential at the grounded side of the resistor 6e as shown in (e) of FIG. 3. During the time period $T_2'$ when the transistor 6b is OFF, the capacitor 6f discharges as shown in (d)' of FIG. 3 through the transistor 6a and then the base and emitter of the transistor 6b is forward biased by the current flowing in the resistor 6d. If the circuit constants are determined in such a manner that the capacitor 6f is charged always up to the source voltage, the time interval $T_2'$ is fixed. And when the transistor 6b is turned on after time interval $T_2'$, the output terminal 6b is short-circuited.

Under this condition, if the output terminal 5g OUT from the collector of transistor 5a is connected to the gate $G_2$ "IN " of the switch 115 of the ignition apparatus of capacitor discharge type as shown in FIG. 2A, the closed circuit of capacitor 113 may be energized to obtain a high voltage for ignition at the optimum ignition time point determined by the apparatus according to the invention.

On the other hand, in the event that the output terminal 6g "OUT" of the collector of the transistor 6b is connected to the gate $G_3$ "IN " of the switch 210 of the ignition apparatus of induction type as shown in FIG. 2B, the switch 210 is energized during the delay time interval $T_2'$ and cut off at the fall of the delay time interval $T_2'$. Therefore, by setting this delay time interval $T_2'$ in a manner sufficient to store electric energy in the primary coil 211a of the ignition coils 211, ignition spark energy is made constant regardless of the rotational speed of the engine. In the present case, the fall of the delay time interval coincides with the ignition time and, therefore the circuit constants on which the values of $T_1$, $m_1$, $m_2$, R, and $T_2$ depend are required to be determined in such a manner as to complete all the operations during a single interval between the rotational angle signals.

As will be seen from the above description, various modifications of the invention are possible if variations in output of the comparator circuit 5 are used as a signal for determining the ignition timing.

Apart from the analog method of control as illustrated in the above-described embodiment, explanation will be made below of an actual example of digital control with reference to FIG. 5.

The pickup 2 is the same as that used in the analog method of controlling. The delay signal generator circuit 3 comprises a set-reset flip-flop 31, an AND gate 32, a first clock pulse generator circuit 33 and a first counter 34. The set input terminal S of the flip-flop 31 is connected to the power generating coil 2c of the pickup 2, while the terminal Q which produces an 1 signal in the set state is connected to an input terminal of the AND gate 32, the output terminal OUT of the clock pulse generator circuit 33 being connected to the other input terminal of the AND gate 32. The output terminal of the AND gate 32 is connected to the input terminal IN of the first counter 34, whereas the output terminal OUT of the counter 34 is connected to the reset input terminal R of the set-reset flip-flop 31, the terminal $\overline{Q}$ being connected to the clear terminal CL of the counter 34 and producing a 1 signal in the reset state of the flip-flop 31. The measuring circuit 4 comprises a couple of AND gates 42 and 43, an OR gate 44 and an up-down counter 45. One of the input terminals of the AND gate 42 is connected to the output terminal OUT of the clock pulse generator circuit 41, while the other input terminal thereof is connected to the output terminal Q of the flip-flop 31. One of the input terminals of the AND gate 43 is connected to the output terminal OUT of the first clock pulse generator circuit 33, while the other input terminal thereof is connected to the output terminal $\overline{Q}$ of the flip-flop 31. The OR gate 44 which receives the outputs from the AND gates 42 and 43 applies its output to the input terminal IN of the up-down counter 45. Symbol UD shows a terminal which receives a command for up or down counting for the counter 45 and is connected to the output terminal $\overline{Q}$ of the flip-flop 31. Upon application of a 1 signal to the terminal UD, the counter 45 begins up counts, and it begins down counts upon receipt of a 0 signal. The comparator circuit 5 comprises a digital comparator 51, a reference generator circuit 52 and an AND gate 53. The digital comparator 51 compares the output of the up-down counter 45 with the output of the reference generator circuit 52, and produces a 1 signal at its output terminal OUT when they coincide with each other. One of the input terminals of the AND gate 53 is connected to the output terminal Q of the flip-flop 31, and the other input terminal thereof to the output terminal OUT of the comparator 51. The second delay time generator circuit 6 comprises an AND gate 61, a second counter 62, a second set-reset flip-flop 63 and an output terminals 64. One of the input terminals of the AND gate 61 is connected to the output terminal OUT of the first clock pulse generator circuit 33, while the output terminal of the AND gate 61 is connected to the input terminal IN of the counter 62. The output terminal OUT of the counter 62 is connected to the reset input terminal R of the flip-flop 63. The set input terminal S of the flip-flop 63 is connected to the output terminal of the AND gate 53 in the comparator circuit 5, while its output terminal Q producing a 1 signal at set state is connected both to the other of the input terminals of the AND gate 61 and to the output terminal 64. On the other hand, the output terminal $\overline{Q}$ producing a 1 signal at reset state is connected to the clear terminal CL of the counter 62.

In the afore-mentioned circuit arrangement, when a pulse output is produced from the pickup 2, the flip-flop 31 is set, thereby producing 1 and 0 signals at output terminals Q and $\overline{Q}$ respectively, so that the AND gate 32 is opened and the output pulses of the clock pulse generator circuit 33 are applied to the counter 34 for being counted. When the counts stored in the counter 34 reach a predetermined level, it produces an 1 signal to be applied to the reset terminal R of the flip-flop 31. As a result, the output terminals Q and $\overline{Q}$ of the flip-flop 31 are put into states 0 and 1 respectively, thereby closing the AND gate 32 and clearing the counter 34 at the same time. This is the operation for obtaining the delay time $T_1$. When the output terminal $\overline{Q}$ of the flip-flop 31 is put into state 1, the AND gate 43 of the measuring circuit 4 is opened, thus setting the counter 45 in the up-count state. The output pulses of the clock pulse generator circuit 33 are applied through the AND gate 43 and OR gate 44 to the counter 45 where they are counted UP. The information stored in the counter 45 is applied to the comparator 51, which produces no output even if the input thereto coincides with the reference since the AND gate 53 is closed. Generation of the next pulse from the pickup 2 causes the flip-flop 31 of the delay signal generator circuit 3 to be set, whereupon the output terminals Q and $\overline{Q}$ of flip-flop 31 are put into states 1 and 0 respectively, so that as in the preceding case the operation cycle for obtaining the delay time $T_1$ is resumed. At the same time, the 1 signal produced at the output terminal Q of the flip-flop 31 causes the AND gate 42 of the measuring circuit 4 to be opened, with the result that the output of the clock pulse generator circuit 41 is applied through the OR gate 44 to the counter 45. Under this condition, the counter 45 is in the down-count state because of the 0 input applied to the terminal UD thereof and therefore the information which was counted up therein is counted DOWN. If the resulting stored information coincides with the reference value as a result of comparison in the comparator 51, a 1 signal is produced by the comparator 51. Since the AND gate 53 is open, the output thereof puts the flip-flop 63 of the switching circuit 6 into the set state, thereby producing a 1 signal at the output terminal 64 "OUT ", which output opens the AND gate 61. With the opening of the AND gate 61, the output pulses of the clock pulse generator circuit 33 are applied to the counter 62, whereupon it counts them to a predetermined point where the output terminal OUT is put into state 1. The flip-flop 63 is reset, thereby producing 0 and 1 outputs at the output terminals Q and $\overline{Q}$ respectively, so that the output at the "OUT" terminal 64 "rises ", thereby clearing the counter 62 and closing the AND gate 61.

If, as in the case of the analog method of control, the input signal to the switch 115 is obtained from the output terminal 54 "OUT" for the ignition apparatus of capacitor discharge type of FIG. 2A and the input signal to the switch 210 from the output terminal 64 "OUT " for the ignition apparatus of induction type of FIG. 2B, it is possible to obtain ignition energy at optimum ignition timing as in the analog control.

The battery power supply which is generally used for driving the ignition apparatus of the induction type has such loads as an engine starting motor, an electromagnetic clutch for the car cooler compressor and other equipment, and for this reason its terminal voltage is subject to continuous variations. Especially at the engine starting time, the load is so increased that the voltage across the battery drops to an extremely low level, making it impossible to obtain sufficient ignition spark energy, resulting in ignition failure in some cases. A known method to prevent such a trouble in the ignition apparatus of induction type is by connecting a resistor in series with the ignition primary coil which resistor is short-circuited at the time of engine start. Because of the continued short-circuited condition of the resistor regardless of the degree of the voltage drop across the battery even after the normal voltage level has been restored as long as the starting switch is kept closed, however, an excessive large current flows in the ignition coils or an unnecessarily high output voltage is produced, thereby making it necessary to provide additional means for protection of the high voltage system as well as an additional margin of safety thereof, resulting in a higher cost. Further, the current flow time in the resistor and ignition coils is lengthened at low engine speeds for increased ineffective heat losses, thereby reducing the reliability of the apparatus. This is also the case for the present invention as far as the ignition apparatus of induction type is concerned.

In view of this, the improvement has been made in the present invention to maintain sufficiently high ignition spark energy even in the case of an excessive voltage drop of the battery power supply.

Figure 6:
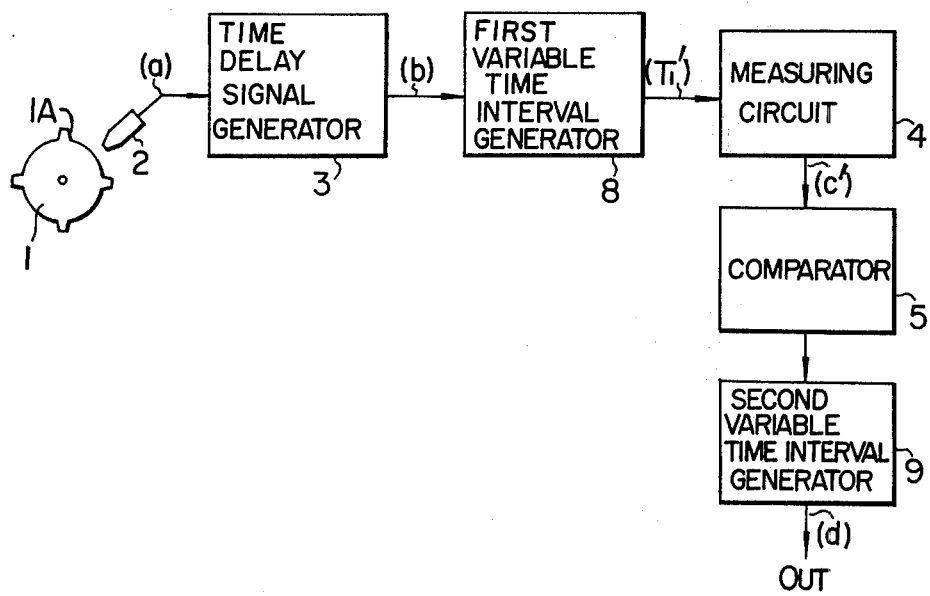
FIG. 6 is a block diagram showing the operating principle of an ignition apparatus to which the present invention is applied.

Referring to FIG. 6 showing the principle of the improvement, like component elements are denoted by like reference numerals in FIG. 1.

Figure 7:
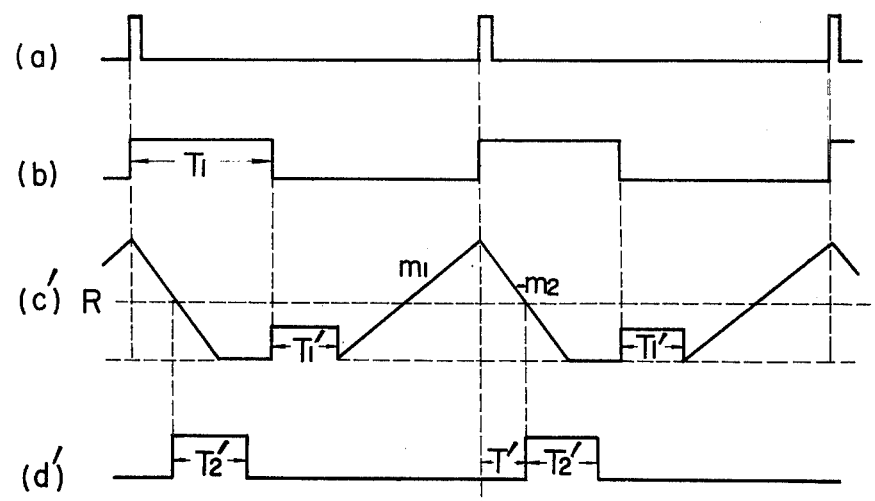
FIG. 7 is a graph showing waveforms for explaining the operation of the application of FIG. 6.

Reference numeral 8 shows a first variable time interval pulse generator circuit for generating a signal corresponding to variations of the voltage across the battery, which is inserted between the delay time generator circuit 3 and the measuring circuit 4. As shown in (c') of FIG. 7, a signal with time interval $T_1'$ corresponding to the battery voltage is generated at the fall point of the delay time interval $T_1$, and at the fall time of $T_1'$ the measuring circuit 4 begins to operate. Numeral 9 shows a second variable time interval generator circuit provided at the stage following the comparator 5.

In this arrangement, the first delay time interval $T_1$ is constant and therefore if the variable time interval pulse $T_1'$ changes with variations of the voltage across the battery, the rise point of the second variable time interval $T_2'$ varies accordingly. However, in view of the fact that the time interval between the generation of the rotational angle signal and the fall point of the second variable time interval $T_2'$ depends on the time interval from fall point of the first delay time interval $T_1$ to the time of generation of the next rotational angle signal, the period of time of current flow in the ignition coils can be controlled in such a manner as to maintain constant amount of electric energy in the ignition coils without affecting the ignition timing for the same rotation speed.

Figure 8:
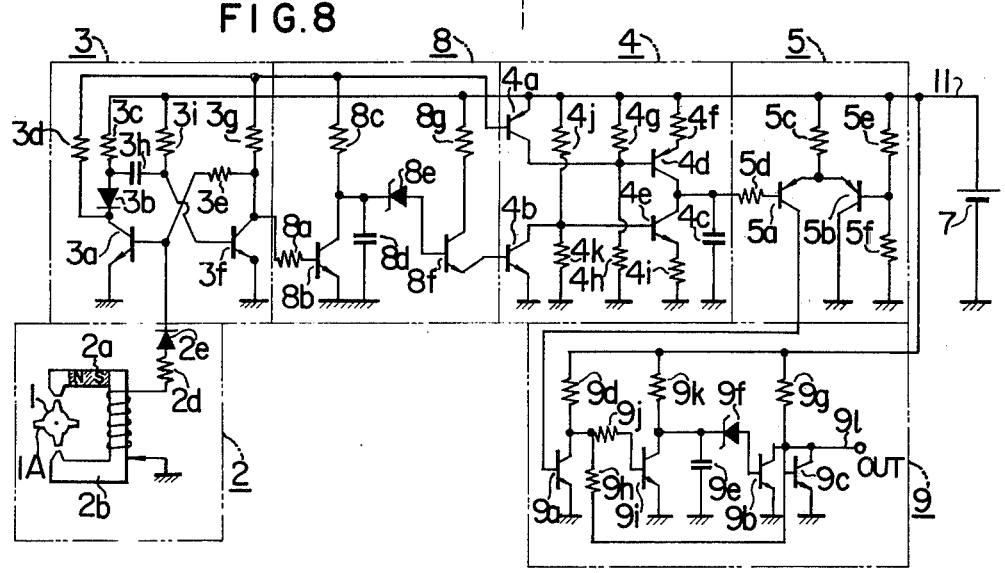
FIG. 8 shows an embodiment of the circuit configuration based on the operating principle illustrated by FIG. 6.

More detailed explanation will be made below with reference to FIG. 8.

Figure 4:
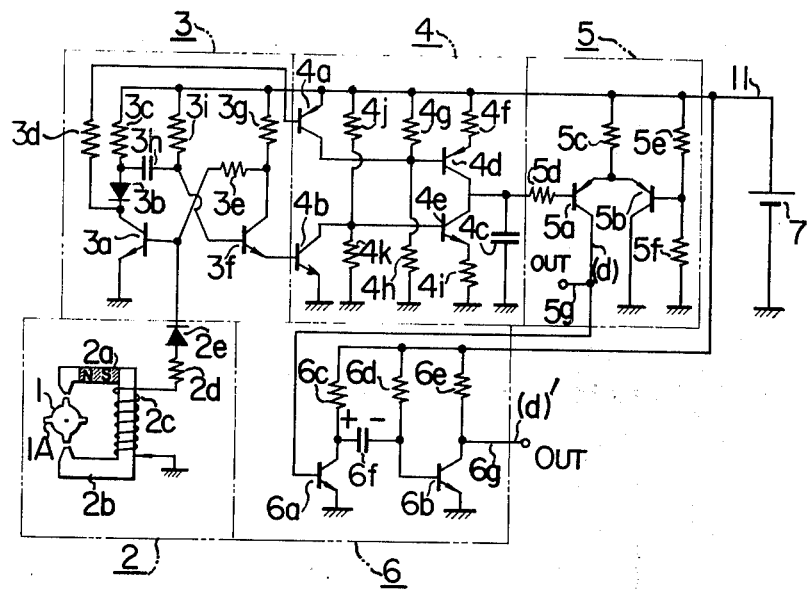
FIG. 4 is a diagram showing an example of circuit arrangement embodying the principle of the present invention.

In the drawing, like reference numerals denote like component elements as in FIG. 4 and will not be described.

Reference numeral 8b shows an NPN transistor which has an emitter grounded, a base connected through the resistor 8a to the collector of the transistor 3f to the first delay time signal generator circuit 3, and a collector connected to the line 11 of the power supply 7 through the resistor 8c. Numeral 8d shows a capacitor with one end thereof grounded and the other end connected to the collector of the transistor 8b. Numeral 8e shows a constant voltage diode having a cathode connected to the ungrounded side of the capacitor 8d and the other terminal thereof connected to the base of the transistor 8f. The collector of the transistor 8f is connected through the resistor 8g to the power line 11 and the emitter thereof to the base of the transistor 4b of the measuring circuit 4 through the resistor 8h.

The variable time interval generator circuit 8 thus constructed is such that the fall of the output $T_1$ of the delay time generator circuit 3 in the preceding stage, that is, the energization of transistor 3f de-energizes the transistor 8b that has thus far been kept energized through the resistor 3g and base resistor 8a The switching of transistor 8b from the ON to the OFF state causes the capacitor 8d to be released from the short-circuited condition between the emitter and collector of the transistor 8b and begins to be charged through resistor 8c. Until the charge voltage of the capacitor 8d reaches the breakover voltage $V_z$ of the constant-voltage diode 8e, no current flows in the diode 8e and thereby the transistor 8f is kept off. When the charge voltage of the capacitor 8d reaches the breakover voltage $V_z$, the transistor 8f is energized as its base is driven by the breakover current of the constant voltage diode 8e.

In this way, simultaneously with the fall of the first delay time interval $T_1$, the transistor 3a is turned off and the transistor 3f on, so that the transistor 4a of the measuring circuit 4 is turned off while transistor 4d thereof is turned on. In the meantime, the transistor 8b of the variable time interval generator circuit 8 is turned off thereby to form a charging circuit for the capacitor 8d. Until the charge voltage reaches the breakover voltage of the constant voltage diode 8e, the transistor 8f is not turned on and therefore the transistor 4b of the measuring circuit 4 is prevented from being energized, so that the capacitor 4c is subjected to a short-circuited condition between collector and emitter of transistor 4e, with the result that the starting of the measuring operation is delayed by $T_1'$ as shown in (c') of FIG. 7.

Let the electrostatic capacity of the capacitor 8d be $C_8$, the resistance value of resistor 8c be $R_8$, the breakover voltage of the diode 8e be $V_8$ and the source voltage be E. The time interval $T_1'$ is expressed as follows:

$$T_1' = R_8 \cdot C_8 \left( \frac{E}{E - V_8} \right) \qquad (4)$$

Explanation will be made now of the second variable time interval generator circuit 9.

Reference numeral 9a shows a transistor having a base connected to the output terminal of the comparator 5, that is, the collector of the transistor 5a, an emitter grounded and a collector connected through the resistor 9d to the power line 11. Numeral 9i shows another transistor having a base connected through the resistor 9j to the collector of the transistor 9a, an emitter grounded and a collector connected through the resistor 9k to the power line 11. Numeral 9e shows a capacitor with an end thereof grounded and the other end connected to the collector terminal of the transistor 9i. Numeral 9f shows a constant voltage diode having an anode connected to the ungrounded terminal of the capacitor 9e and a cathode to the base of the transistor 9b. The emitter of the transistor 9b is grounded and its collector is connected through the resistor 9g to the power line 11. Numeral 9c shows a transistor with its emitter grounded, its collector connected to the collector of the transistor 9b and its base to the collector of the transistor 9a through the resistor 9h.

The second variable time interval generator circuit 9 thus constructed operates as described below.

When the transistor 9a is turned on in response to the output from the comparator circuit 5, the transistor 9i that has thus been ON is turned off, thus starting the charging of the capacitor 9e. At the same time, the transistor 9c that has also thus far been energized is cut off, thereby producing an output at the output terminal 9l. When the charge voltage of the capacitor 9e reaches the breakover voltage of the constant voltage diode 9f, the base of the transistor 9b is forward-biased into energized state, so that no output is produced at the output terminal 9l due to the short-circuiting between the collector and emitter of the transistor 9b.

Let the electrostatic capacity of the capacitor 9e be $C_9$, the resistance value of resistor 9k be $R_9$, the breakover voltage of the diode 9f be $V_9$ and the source voltage be E. And the time interval $T_2'$ is expressed as $$T_2' = R_9 \cdot C_9 \left( \frac{E}{E - V_9} \right) \qquad (5)$$

It will be apparent from the foregoing explanation that when the source voltage is decreased, the time required for the charge voltage of the capacitor 8d of the first variable time interval generator circuit 8 to reach the breakover voltage of the diode 8e is lengthened and accordingly the starting of operation of the measuring circuit 4 is proportionally delayed, thus shortening the period of time required for the charging of the capacitor 4c of the measuring circuit 4 before the generation of the next rotational angle signal, so that it takes a shorter time for the predetermined value R to be reached by the capacitor 4c which begins to discharge simultaneously with the application thereto of the rotational angle signal. As a result, the output from the comparator circuit 5 is produced earlier and therefore the capacitor 9e of the second variable time interval generator circuit 9 begins to discharge earlier, so that, in spite of the voltage drop, the capacitor 9e is charged always up to the breakover voltage of the diode 9f, thereby lengthening the charging time of the capacitor 9e by the amount corresponding to the source voltage drop, with the result that the time interval of the output determined by the charging time of the capacitor 9e is lengthened, thus maintaining the output constant despite the voltage drop.

Considering the relation between the source voltage and the variable time intervals $T_1'$ and $T_2'$ on the basis of equations (4) and (5), $T_2'/T_1'$ is fixed for all values of voltage drop if the diodes 8e and 9f are set at the same breakover voltage. So, it will be seen that the ignition time point or the rise time of the variable time interval $T_2'$ determined by the rotational speed is constant for the same rotational speed without being affected by the voltage drop. In this case, it is obvious that the factor $k_1/k_2$ of the capacitor 4c of the measuring circuit 4 which charges and discharges at a constant current is not affected by the source voltage variations.

Figure 9:
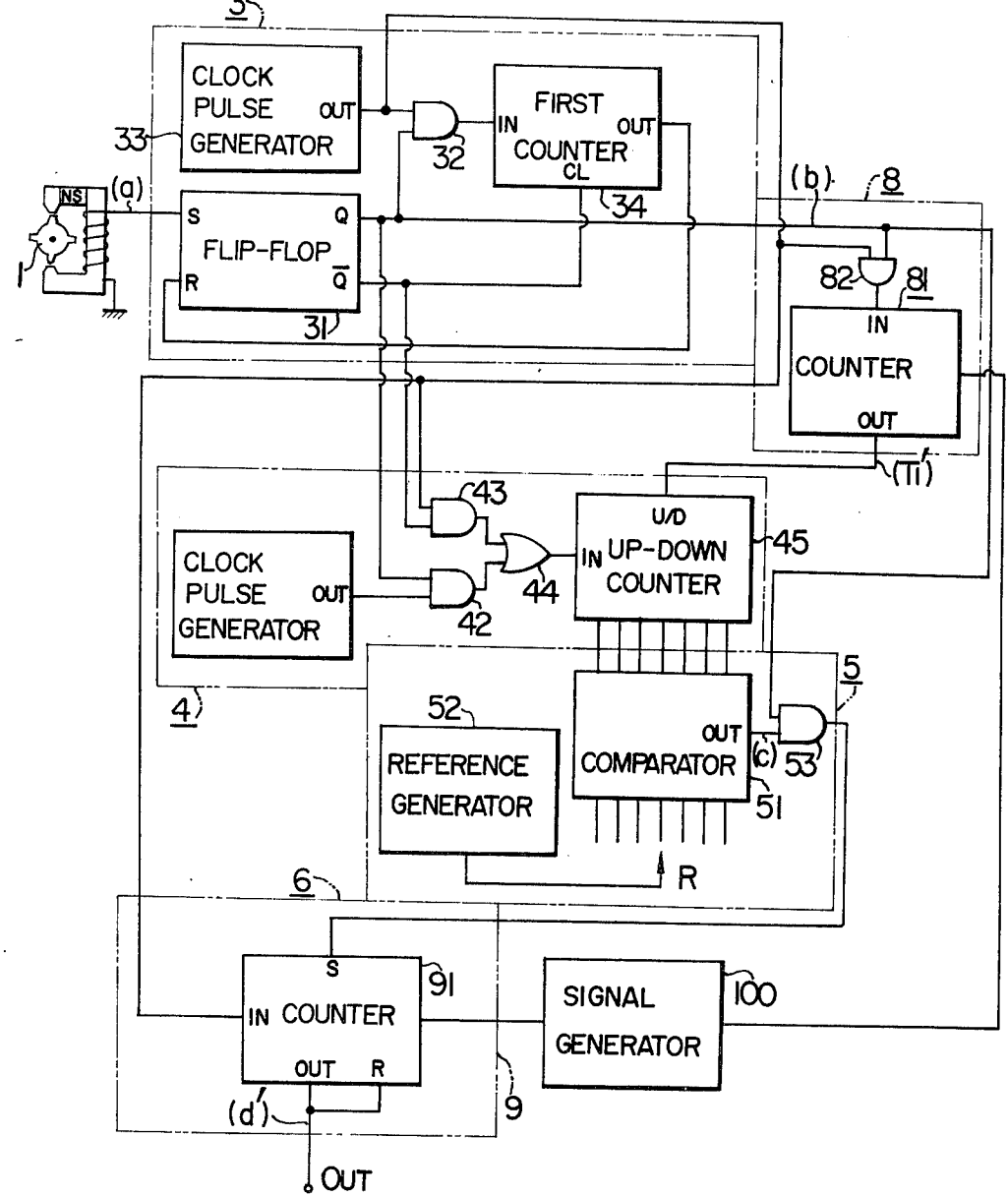
FIG. 9 is a block diagram showing a digitalized case of the embodiment of FIG. 8.

The digitalization of the circuit shown in FIG. 8 will be explained with reference to FIG. 9. In the drawing, like numerals denote like component elements in FIG. 5.

Reference numeral 81 shows a counter the input terminal of which is connected through the AND gate 82 to the clock pulse generator circuit 33 and to the output terminal Q of the flip-flop 31. The output terminal of the counter 81, on the other hand, is connected to the up-down change-over terminal U/D of the up-down counter 45 of the measuring circuit 4. Numeral 100 shows a signal generator circuit for generating a digital signal inversely proportional to the source voltage. Numeral 91 shows another counter whose set input terminal S is connected to the output terminal of the AND gate 53, while its input terminal IN is connected to the clock pulse generator circuit 33, the output terminal of the counter 91 being connected to a given circuit to be controlled. The output from the signal generator circuit 100 is applied to the two counters 81 and 91 as set inputs.

The operation of the above-described circuit will be explained below.

When the output terminal Q of the flip-flop 31 is turned to produce a 1 signal, the counter 81 begins to count pulses through the AND gate 82, until the counts become equal to the pulses applied from the signal generator circuit 100 when the counter 81 produces a 1 signal. This output signal causes the up-down counter 45 of the measuring circuit 4 to be actuated, so that the clock pulses are counted up through the AND gate 43 and OR gate 44. When a rotational angle signal is generated in the pickup 2 thereby to reverse the state of the output of the flip-flop 31, the clock pulses produced by the clock pulse generator circuit 41 are counted down through the AND gate 42 and OR gate 44. When the number counted reaches the predetermined value R, a 1 signal is produced by the comparator 51 and thereby an output is produced from the AND gate 53. This output sets the counter 91, which begins to count the clock pulses up to the predetermined value. Meanwhile, output pulses are produced at the output terminal of the counter 91, thus energizing the circuit to be controlled. Next, when the counts reach the predetermined level, the output of the counter 91 is reduced to 0, thereby resetting the same.

As can be seen from the above description, digital signals inversely proportional to the source voltage are used for controlling the counts of the counters 81 and 91 included in the first and second variable time interval generator circuits 8 and 9, thereby to subject the time interval of the output generated by the counter 91 to variations inversely proportional to the source voltage. Such variations are achieved by variations in the time points when the counter 91 begins to operate, the latter variations being effected by varying the output of the comparator circuit 5 taking advantage of the variations of the output of the counter 81, whereas the fall time point of the output of the counter 91 is determined only by the rotational speed. As a result, it is possible to prevent variations in the electric energy of the ignition apparatus which otherwise might occur due to variations in source voltage, thereby actuating the ignition apparatus always by a fixed amount of electric energy, without adversely affecting the optimum ignition time point depending on the rotational speed of the engine.

Figure 10:
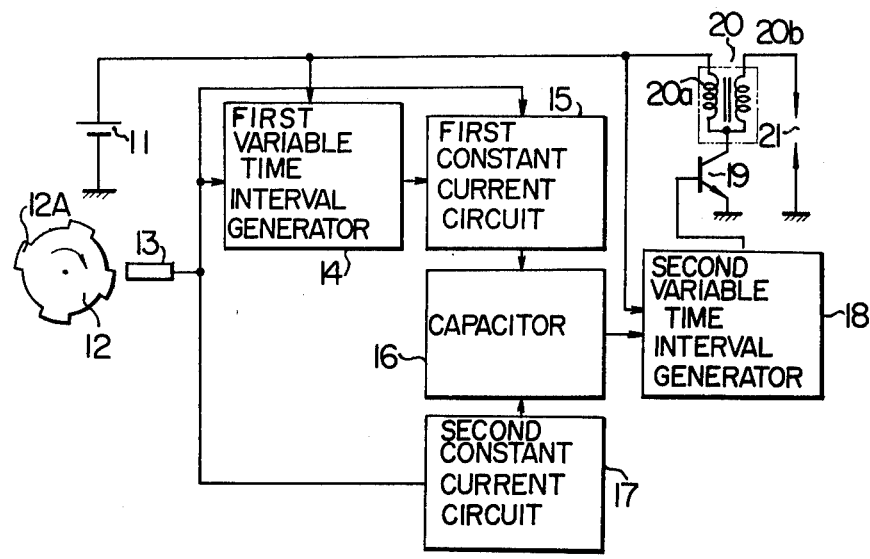
FIG. 10 is a block diagram showing the operating principle of another embodiment of the invention.
Figure 11:
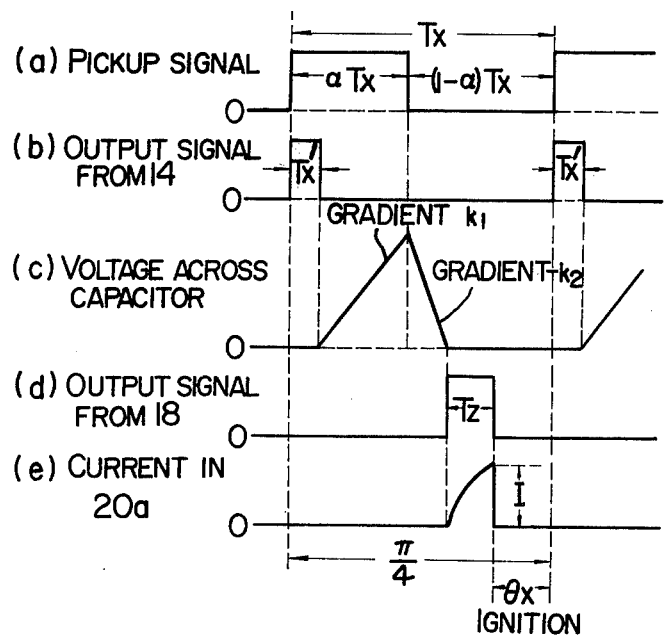
FIG. 11 is a diagram showing waveforms for explaining the operation of the embodiment of FIG. 10.

The operating principle of another embodiment of the invention will be explained below with reference to FIGS. 10 and 11 showing a block diagram and a waveform diagram showing the operation of the circuit of FIG. 10, respectively.

In FIG. 10, reference numeral 11 shows a battery with its negative electrode grounded. Numeral 12 shows a rotor rotating in synchronism with the engine which has four protrusions 12A as shown. Numeral 13 shows a contactless pickup such as a proximity switch which produces a signal indicating the presence or absence of the protrusions 12A of the rotor 12. Numeral 14 shows a first variable time interval pulse generator circuit which produces output pulses of different widths according to the magnitude of the voltage across the battery 11 and is triggered at the rise point of the signal produced by the pickup 13. The width of each output pulse produced by the first variable time interval pulse generator circuit 14 is hereinafter assumed to be $Tx'$. Numeral 15 shows a first constant current circuit which continues to operate from the fall time of the output of the first variable time interval pulse generator circuit 14 to the fall time of the signal produced by the pickup 13. Numeral 16 shows a capacitor charged through the first constant current circuit 15. Because of the interposition of the constant current circuit 15, the voltage across the capacitor 16 changes linearly as it is charged, and the gradient of such voltage changes will be expressed hereinafter as $k_1$ (V/S). Numeral 17 shows a second constant current circuit which forms a discharge path for the capacitor 16 and is kept energized from the fall time of the signal produced by the pickup 13 until completion of release of all the charges in the capacitor 16. In this case, also, the gradient of voltage changes of the capacitor 16 is linear and will be referred to as $-k_2$ (V/S). Numeral 18 shows a second variable time interval pulse generator circuit which produces output pulses of different widths in response to the voltage across the battery 11 and is triggered when the voltage across the capacitor 16 has been reduced to zero. The width of the output pulses produced by the circuit 18 will be hereinafter expressed as $T_z$. Numeral 19 shows an NPN transistor with its emitter grounded and its base driven by the output of the second variable time interval pulse generator circuit 18. Numeral 20 shows ignition coils comprising the primary coil 20a and the secondary coil 20b. One end of the primary coil 20a is connected to the positive electrode of the battery 11 and the other end thereof to the collector of the NPN transistor 19. One end of the secondary coil 20b is connected to the collector of the transistor 19. Numeral 21 shows a discharge gap with a grounded electrode and ungrounded electrode, the ungrounded electrode being connected to the other end of the secondary coil 20b of the ignition coils 20.

The waveforms produced from the various component elements of the above-mentioned circuit are shown in (a) to (e) of FIG. 11. The graph of (a) represents an output signal from the pickup 13 the length or period $Tx$ of which varies with the rotation of the engine. The rate of the length of high level state of this signal to the length of period $Tx$ is a value fixed by the protrusion 12A and is expressed as $\alpha$. The diagram of (b) shows an output signal from the first variable time interval pulse generator circuit 14, which is a signal with the pulse width of $Tx'$ produced as from the rise time of the pickup signal. Symbol (c) shows a voltage across the capacitor 16 which is charged at the voltage gradient of $k_1(V/S)$ through the first constant current circuit 15 after $Tx'$ following the time when the pickup signal has reached its high level, while it discharges at the fixed voltage gradient of $-k_2(V/S)$ through the second constant current circuit 17 when the pickup signal is decreased to the low level. The graph of (d) shows an output signal produced from the second variable time interval pulse generator circuit 18 which produces a pulse with the width of $Tz$ beginning at the end of discharge of the capacitor 16. The curve (e) shows a waveform of current flowing in the primary coil 20a of the ignition coils 20 which rises at a time point determined by the time constant due to the inductance and circuit resistance of the ignition coils and is cut off when the current level I is reached after $Tz(S)$, due to the fact that the transistor 19 is made to conduct for the period of $Tz(S)$ as its base is driven by the output of the second variable time interval pulse generator circuit 18. The cutting-off of the current I causes the electromagnetic energy stored in the ignition coils 20 to be released and as a result a high voltage is generated in the secondary coil 20b, whereupon a discharge occurs in the discharge gap, thereby igniting the mixed gas into combustion.

Ignition point $\theta$ in the aforementioned apparatus is obtainable in the manner mentioned below.

First, the maximum value Vc max of the voltage Vc stored in the capacitor 16 is $$Vc\ max = K_1(a.Tx - Tx') \qquad (1)$$

Let the time required for the voltage Vc to be completely discharged be $Td$. Then the following equations are obtained:

$$k_2.Td = Vc = k_1(a.Tx - Tx') \qquad (2)$$

$$Td = \frac{k_1}{k_2}(a.Tx - Tx') \qquad (3)$$

Therefore, the time $Tig$ when ignition occurs as it is related to the rise time of the pickup signal is expressed by the equation below.

$$Tig = (1 - \alpha)Tx - Td - Tz$$
$$= 1 - \left(1 + \frac{k_1}{k_2}\right) \cdot \alpha \cdot TX + \left(\frac{k_1}{k_2} \cdot Tx' - Tz\right) \qquad (4)$$

The angle of this ignition time point is given as $$\frac{Tig}{T} = \frac{\theta}{\pi/4} \qquad (5)$$

As a result, $$\theta = \left[1 - \left(1 + \frac{k_1}{k_2}\right) \cdot \alpha + \left(\frac{k_1}{k_2}Tx' - Tz\right)\frac{1}{Tx}\right] \cdot \frac{\pi}{4} \qquad (6)$$

In the equation (6) above, if the coefficient of $1/Tx$ in the second term is zero, the ignition time point is always the same. That is, if $$\frac{k_1}{k_2} = \frac{Tz}{Tx} \qquad (7)$$

ignition always at the same physical point is possible for all speeds of rotation. This is easily realized since $k_1$, $k_2$, $k$, $Tz$ and $Tx'$ are all determined by the circuits 14 to 18.

The output of the ignition apparatus under consideration depends on the cut-off current I of the ignition coils 20. Let the inductance of the ignition coils 20 be L, the voltage of the battery 11 be E and the resistance of the primary coil be $Rx$. The cut-off current I is $$I = \frac{E}{Rx}\left(1 - \epsilon^{-\frac{Tz}{\left(\frac{L}{Rx}\right)}}\right) \qquad (8)$$

If the cut-off current $I$ is to be maintained constant regardless of the variations of the source voltage $E$, the time interval $Tz$ may be changed in accordance with the source voltage $E$ to obtain the equation $$Tz = \frac{L}{Rx}\ln\left(\frac{E}{E - Rx \cdot I}\right) \qquad (9)$$

In view of the fact that any change in time interval $Tz$ results in a change in the ignition time point as the relation of equation (7) is not met any more, both $Tx'$ and $Tz$ are required to be changed in the same proportion with respect to voltage variations.

A particular embodiment of the present invention illustrated in FIG. 10 will be explained below with reference to FIG. 12.

In the drawing, reference numerals 140 to 149 show component elements making up a first variable time interval pulse generator circuit 14. Numeral 140 shows a resistor connected to the pickup 13, and numeral 141 an NPN transistor with its base connected to the resistor 140 and with its emitter grounded. Numeral 142 shows a resistor inserted between the positive electrode of the battery and the collector of the NPN transistor 141, numeral 143 a resistor with one terminal thereof connected to the collector of the NPN transistor 141, numeral 144 an NPN transistor with its base connected to the other terminal of the resistor 143 and its emitter grounded, and numeral 145 a capacitor inserted between the collector and emitter of transistor 144. Numeral 146 shows a resistor connected between the collector of the transistor 144 and the positive electrode of the battery, numeral 147 a constant voltage diode with its cathode connected to the collector of the transistor of 144, numeral 148 an NPN transistor with its base connected to the anode of the constant voltage diode 147 and with its emitter grounded, and numeral 149 a resistor inserted between the collector of the transistor 148 and the positive electrode of the battery. Numeral 121 shows a resistor with one of its terminals connected to the collector of the transistor 148 and numeral 122 an NPN transistor with its base connected to the other terminal of the resistor 121 and with its emitter grounded.

The circuit with the above-described arrangement operates in the manner mentioned below.

When the output level of the pickup 13 is raised with the protrusion 12A of the rotor 12 detected, the transistor 141 is energized through the resistor 140, whereupon the transistor 144 which has thus far been in energized state through the resistors 142 and 143 is cut off. As the result of stoppage of the short-circuited condition between collector and emitter of the transistor 144, the capacitor 145 begins to charge through the resistor 146. Until the charge voltage of the capacitor 145 reaches the breakover voltage $Vz_{47}$ of the constant voltage diode 147, no current flows in the diode 147 and the transistor 148 remains cut off. When the charge voltage of the capacitor 145 reaches the breakover voltage $Vz_{47}$, the transistor 148 begins to conduct with its base driven by the breakover current of the constant voltage diode 147. In other words, the transistor 148 begins to conduct when the time $Tx'$ determined by the resistance value $R_{46}$ of the resistor 146, the electrostatic capacity $C_{45}$ of the capacitor 145 and the breakover voltage $Vz_{147}$ of the constant voltage diode 147 has passed from the rise time of the output signal of the pickup 48. This time $Tx'$ is given by the equation $$Tx' = R_{46} \cdot C_{45} \cdot \ln\left(\frac{E}{E - Vz_{47}}\right) \quad (10)$$

At the same time, the transistor 122 is energized through the resistors 149 and 121 and operates oppositely to the transistor 148.

The component elements 150 to 153 make up a first constant current circuit 15 and the elements 170 to 173 a second constant current circuit 17.

Reference numeral 150 shows a resistor with one end thereof connected to the positive electrode of the power supply, and numeral 151 an NPN transistor with its emitter connected to the other end of the resistor 150 and with its collector connected to the collector of the transistor 122. Numerals 152 and 153 show resistors connected in series across the power supply which have a junction point connected to the base of the transistor 151.

The first constant current circuit having a similar configuration to the second constant current circuit includes a resistor 170, a transistor 171, a resistor 172 and a resistor 173 which correspond to the resistor 150, transistor 151, resistor 152 and resistor 153 respectively. The first constant current circuit is different from the second constant current circuit, however, in that the collector of the transistor 171 is connected not to the collector of the NPN transistor 122 but to the base of the NPN transistor 181 described later, while the emitter of the transistor 181 is grounded. Further, a capacitor 16 is inserted between the collectors of the NPN transistor 151 and 171.

The operation of the above-mentioned circuit will be explained below.

The transistor 122 remains energized for the period of time $Tx'$ following the rise of the output signal from the pickup 3, and therefore during the same period, the potential of the capacitor 16 on the side of the collector of the transistor 151 is zero, while the capacitor 16 is also maintained at zero potential on its side of the collector of the transistor 171 through the base and emitter of the transistor 181, resulting in the zero voltage across the capacitor 16. After the lapse of time $Tx'$ following the rise of the output signal of the pickup, the transistor 122 is cut off, so that the capacitor 16 begins to be charged through the resistor 150 and the transistor 151. Since the base potential of the transistor 151 is fixed by the resistors 152 and 153, the voltage drop of the resistor 150 is limited to a certain extent, thus maintaining a constant current in the collector of the transistor 151. As a result, the charge voltage of the capacitor 16 is increased linearly. When the output voltage of the pickup 13 is reduced to zero, the transistor 141 is cut off and the transistor 144 begins to conduct, with the result that the transistor 148 is cut off while the transistor 122 conducts. The potential of the capacitor 16 on the side of the collector of the transistor 151 is reduced to zero, while the potential of the capacitor 16 on the side of the collector of the transistor 171 is reduced by the amount corresponding to the charge voltage, thereby cutting off the transistor 181. Subsequently, the potential of the capacitor 16 on the side of the collector of the transistor 171 begins to be increased through the second constant current circuit 17. The current flows in this case through the resistor 170 and transistor 171 included in the circuit comprising the elements 170 to 173 similar to the circuit elements 150 to 153 of the first constant current circuit, and so such a current is constant, resulting in a linear change in voltage. This condition continues until the potential of the capacitor 16 on the side of the collector of the transistor 171 is again reduced to zero and clamped by the base and emitter of the transistor 181. The result is the voltage across the capacitor 16 as indicated by $(c)$ of FIG. 11. The gradients of potential change $k_1$ and $-K_2$ are determined by the values of current flowing in the first and second constant current circuits 15 and 17 respectively. The charge current Ic is thus expressed by the equation $$Ic = \frac{R_{53}}{R_{50}(R_{52} + R_{53})} \cdot E \quad (11)$$

where $R_{150}$, $R_{152}$ and $R_{153}$ are the resistance values of the resistors 150, 152 and 153 respectively.

The gradient $k_1$ is therefore given as $$k_1 = \frac{Ic}{C_6} = \frac{R_{53}}{R_{50}C_6(R_{52} + R_{53})} \cdot E \quad (12)$$

where $C_6$ is the capacitance of the capacitor 6. In quite a similar manner, $k_2$ is $$k_2 = \frac{R_{73}}{R_{70}C_6(R_{72} + R_{73})} \cdot E \quad (13)$$

Figure 12:
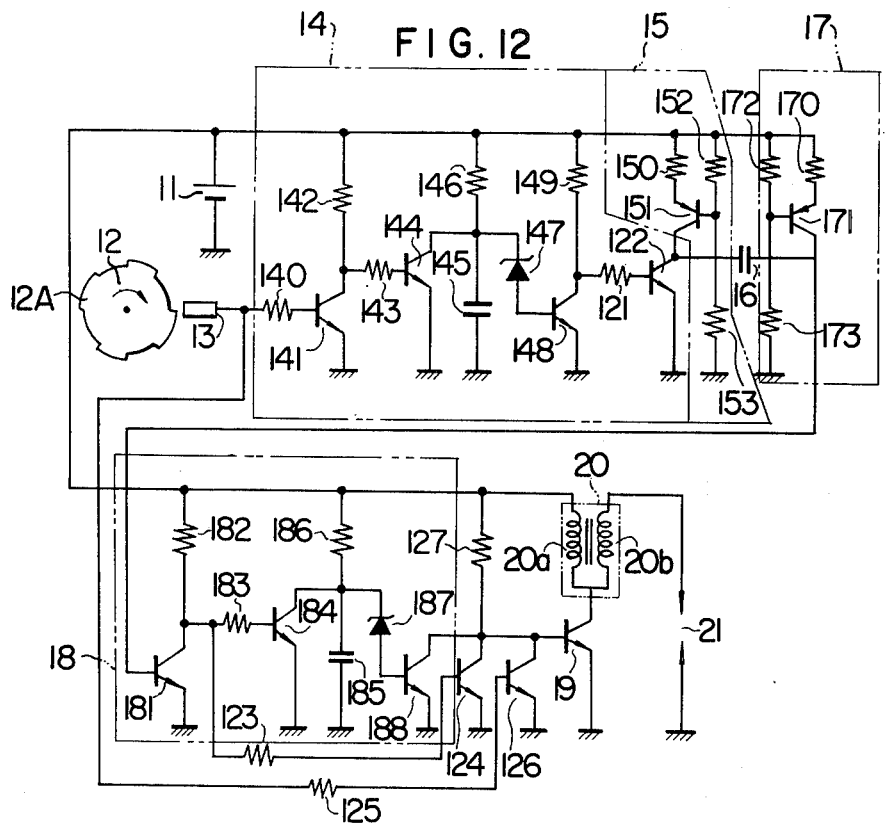
FIG. 12 shows an example of circuit configuration based on the operating principle of the embodiment of FIG. 10.

Turning to FIG. 12, reference numerals 181 to 188 show component elements making up a second variable time interval pulse generator circuit 18. The component elements and their connections are quite similar to those of the first variable time interval pulse generator circuit 14 comprising the circuit elements 141 to 148. Reference numeral 181 shows an NPN transistor with its base connected to the collector of the NPN transistor 171 and its emitter grounded. The transistor 181 is constructed and connected quite the same way as the transistor 141, the resistor 182 as the resistor 142, the resistor 183 as the resistor 143, the transistor 184 as the transistor 144, the capacitor 185 as the capacitor 145, the resistor 186 as the resistor 146, and the diode 187 as the diode 147. Numeral 188 shows an NPN transistor with its base connected to the anode of the constant voltage diode 187 and its emitter grounded.

The circuit with the above-described construction operates in the manner mentioned below.

The transistor 181 is cut off as it is inversely biased between base and emitter only during the discharge of the capacitor 16. As long as the transistor 181 remains cut off, the transistor 184 is energized through the resistors 182 and 183. When the transistor 181 begins to conduct again upon completion of discharge of the capacitor 16, the transistor 184 is cut off and the capacitor 185 is charged through the resistor 186. The transistor 188 conducts when the charge voltage of the capacitor 185 exceeds the breakover voltage of the diode 187. The delay time Tz from the completion of discharge of the capacitor 16 to the conduction of the transistor 188 is obtained, like the equation (10), as follows:

$$Tz = R_{86} \cdot C_{85} \cdot \ln\left(\frac{E}{E - Vz_{87}}\right) \quad (14)$$

where $R_{86}$ shows the resistance value of the resistor 186, $C_{85}$ the electrostatic capacity of the capacitor 185, and $Vz_{87}$ the breakover voltage of the diode 187. After all, the NPN transistor 188 is cut off at the beginning of discharge of the capacitor 16 and regains its conductive state after the lapse of time Tz following the completion of the discharge.

Again in FIG. 12, the elements 123 to 127 make up an output circuit. Reference numeral 123 shows a resistor with one end thereof connected to the collector of the transistor 181, numeral 124 an NPN transistor with its base connected to the other end of the resistor 123 and with its emitter grounded, and numeral 125 a resistor with one end thereof connected to the output terminal of the pickup 13, and numeral 126 another NPN transistor with its base connected to the other end of the resistor 125 and with its emitter grounded. All of the collectors of the NPN transistors 188, 124 and 126 are connected to the base of the NPN transistor 9. Numeral 127 shows a resistor inserted between the positive electrode of the power supply and the base of the transistor 19.

In the circuit arrangement mentioned above, the transistor 124 is energized by the collector potential of the transistor 181 through the resistor 123, and therefore it conducts during the discharge of the capacitor 16 while it remains cut off when the capacitor 16 is not discharging. Further, the transistor 126, which is driven by the output of the pickup through the resistor 125, conducts at the high level of the pickup signal and remains cut off for the other period of time. As a result, it is only during the time Tz following the completion of discharge of capacitor 16 that all of the transistors 188, 124 and 126 are in cut-off state.

For this reason, the transistor 19 is driven through the resistor 127 into conductive state during the time period Tz, so that the current as shown in (e) of FIG. 11 is supplied to the primary coil 20a of the ignition coils 20.

Whereas the cut-off current in the abovementioned case is given by the equation (8), the time Tz has the voltage dependence characteristic as shown by equation (14). The comparison of the equation (14) with (9) shows that both the equations become equal to each other when $L/Rx = R_{86} \cdot C_{85}$ and $Rx \cdot I = Vz_{87}$. In other words, it is possible to obtain a stable cut-off current I desirable from the viewpoint of the output characteristics regardless of the variations of voltage E by appropriately determining the circuit constants L and Rx of the ignition coils and accordingly the values of $C_{85}$, $R_{86}$ and $Vz_{87}$ in such a manner as to satisfy the above-mentioned relation therebetween.

By comparing the equation (10) with equation (14), on the other hand, it will be seen that Tz/Tx' is not voltage-dependent when $Vz_{47} = Vz_{87}$. It is also obvious from equations (12) and (13) that $k_1/k_2$ is not voltage-dependent. Therefore, it is possible to eliminate the voltage dependence characteristics of the ignition time by selecting the same breakover voltage for both the constant voltage diodes 147 and 148 and by determining the circuit constants in such a manner as to satisfy equation (7).

In this way, the cut-off current of the primary coil of the ignition coils 10 is maintained constant even in the case of variations in source voltage, thus making it practicable to obtain an ignition apparatus with its ignition point not displaced from the predetermined one.

Figure 13:
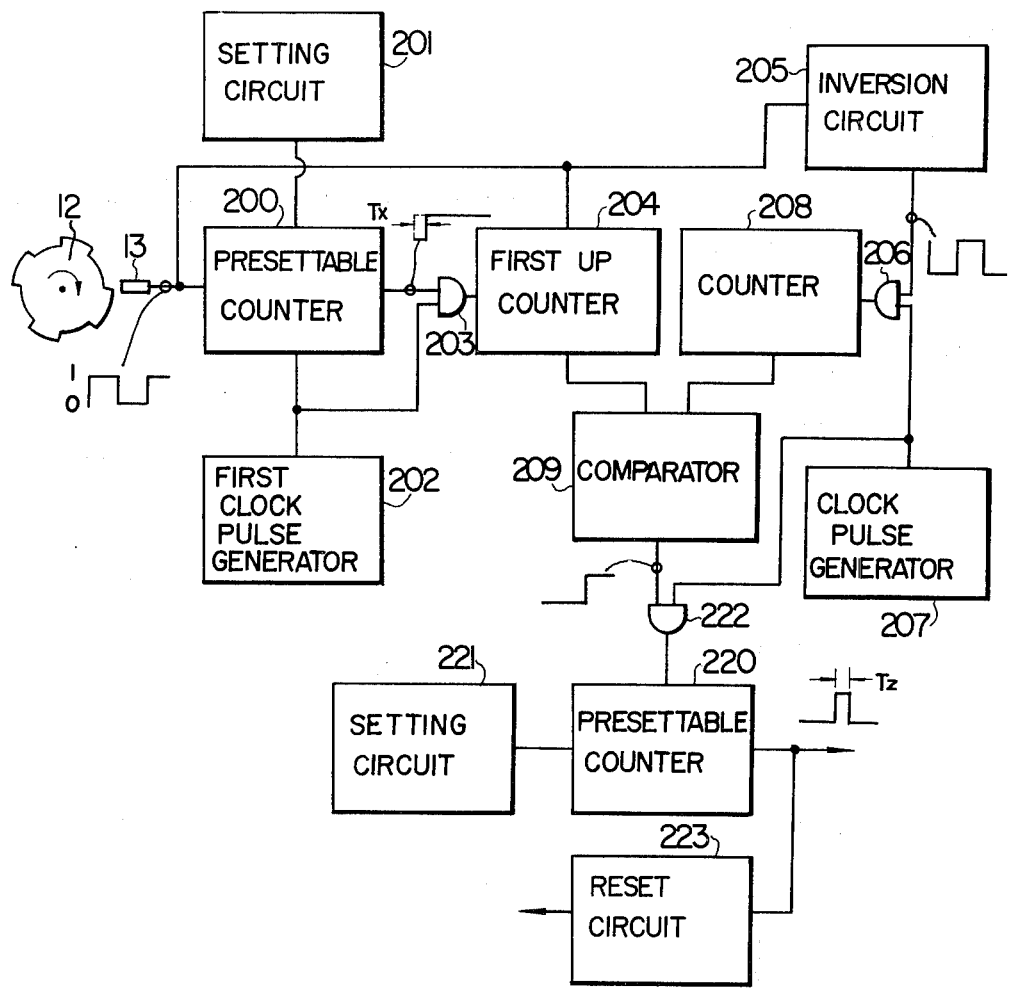
FIG. 13 is a diagram showing the circuit arrangement of a digitalized example of the circuit shown in FIG. 12.

A digital application of the circuit shown in FIG. 12 will be explained with reference to FIG. 13.

In the drawing, reference numerals 12 and 13 show a rotor and a pickup respectively as in the preceding case. Reference numeral 200 shows a presettable counter for generating time Tx' the length of which depends on the output from the setting circuit 201 in accordance with the magnitude of the source voltage. The presettable counter 200 counts the output pulses of the first clock pulse generator circuit 202 and produces a 1 signal after lapse of $T_1$ corresponding to the magnitude of the source voltage following the production of a 1 output from the pickup 13. Numeral 203 shows an AND gate which receives as inputs the output of the presettable counter 200 and that of the clock pulse generator circuit 202. Numeral 204 shows a first up-counter for counting the output pulses of the AND gate 203 as long as the output of the pickup 13 remains in the state of 1. This counting operation corresponds to the charging of the capacitor 16 in the preceding case. Numeral 205 shows an inversion circuit for inverting the output of the pickup 13 and applying it to the AND gate 206, so that the output pulses of the clock pulse generator circuit 207 are applied to the second up-counter 208 to be counted thereby while the pickup signal is in the 0 state. This process of inversion circuit 205 corresponds to the discharging of the capacitor 6. Numeral 209 shows a comparator circuit for comparing the counts $C_1$ of counter 204 with the counts $C_2$ of the counter 208 and producing a 1 signal when $c_1 \leqq c_2$. Numeral 220 shows a presettable counter which, on the basis of information supplied by the setting circuit 221 on the counts to be made in accordance with the magnitude of the source voltage, begins to count the clock pulses from the pulse generator 207 through the AND gate 222 starting from the time when a 1 signal is produced by the comparator 209. In the process, that is, as long as actual counts are below the set counts to be made, the counter 220 produces a 1 signal, which signal is used to turn on the power transistor 19. When the counts reach the preset level, the counter 220 produces a 0 signal, thus cutting off the transistor 9 thereby to generate an ignition spark. The current involved in this case flows for the period of $T_2$ referred to above. When the output of the counter 220 changes from 1 to 0, the reset cicuit 223 is energized thereby to reset the counters and the comparator.

The above-mentioned digital method eliminates the requirement for circuit adjustment and therefore has the advantage of the ease with which integrated circuitry is achieved.

In spite of the provision of time Tx', in the above-mentioned two embodiments, to effect ignition exactly at the set time point, the means for providing the time Tx' may be eliminated in some cases where variations in source voltage are associated with the rotation of a starting motor and some displacement of ignition time point poses no great problem.

It will be seen from the above description that according to the present invention the switching between adding and subtracting operations of counter means at a predetermined rate without regard to the engine speed occurs at the time of generation of a first rotational angle signal associated with an engine rotational angle, so that the adding operation at the above-mentioned rate begins at the time of generation of a rotational angle signal immediately preceding to the first rotational angle signal or at a time point after the lapse of a predetermined period of time independent of the engine speed subsequent to such a time of generation of the preceding rotational angle signal, followed by the subtraction of the results of the addition upon generation of the first rotational angle signal. Means are also provided for generating an output signal when the counts of the subtraction reach a predetermined level, which output signal is used to energize the ignition circuit while at the same time determining the optimum ignition timing. Because of this arrangement, the present invention has the advantages that 1. the optimum ignition time point of the engine is easily and automatically achieved in accordance with each engine speed while assuring high accuracy of the ignition apparatus of this kind;
2. the optimum ignition time associated with the engine speed is capable of being determined by means of only one rotational angle signal associated with engine rotational speed;
3. it is possible to obtain an ignition apparatus of induction type with very small ineffective power consumption by providing means for generating a signal with a predetermined width in response to the output signal generated by the aforementioned means when the counts of subtraction reaches the predetermined point, so that current is made to flow in the primary coil of the ignition coils for a certain period of time and the circuit of the primary coil is opened simultaneously with the rise of the above-mentioned signal with a predetermined width; and
4. further, means are also provided for delaying the accumulating operation by the length of time inversely proportional to the magnitude of the source voltage for driving the ignition circuit, so that the time required for the predetermined level of the counts of subtraction to be reached varies with the source voltage and such variations are referred to in adjusting the period of time of current flow in the primary coil of the ignition coils, with the result that a fixed amount of electric energy is stored in the primary coil of the ignition coils all the time.

What is claimed is:

1. An ignition apparatus for an internal combustion engine comprising:

means for generating a rotational angle signal associated with the rotational speed of the engine prior to the optimum ignition timing of an engine;

first time delay establishing means adapted to be actuated from the simultaneous time point with the generation of a first rotational angle signal derived from said rotational angle signal generator means;

first measuring means for measuring at a first predetermined coefficient independent of the engine speed the length of time from the time point following the lapse of a predetermined period of time established by said first time delay establishing means until the time point of the generation of a second rotational angle signal derived from said rotational angle signal generator means;

second measuring means adapted to be actuated from the time point of the generation of said second rotational angle signal for measuring at a second predetermined coefficient independent of the engine speed the difference between the measured value of said first measuring means and a predetermined reference value;

means for generating an ignition timing signal when the measured value of said second measuring means reaches a predetermined value;

switching means disposed in a primary coil circuit of ignition coils and adapted to be controlled by the ignition timing signal so that electromagnetic induction is caused in said ignition coils by the actuation of said switching means to generate ignition energy of high voltage in a secondary coil circuit of said ignition coils.

2. An ignition apparatus for an internal combustion engine according to claim 1, in which said ignition apparatus further comprises means for generating one rotational angle signal for each ignition cycle of the internal combustion engine and means for generating a delay signal with a predetermined width of time starting from the time point of the generation of said rotational angle signal, so that said first measuring means is actuated from the falling time of said delay time signal.

3. An ignition apparatus for an internal combustion engine according to claim 2, in which said ignition apparatus further comprises pickup means for generating one rotational angle signal for each ignition cycle of the internal combustion engine, a first and second fixed frequency oscillators, a first counter adaptable actuated in response to the output signal from said pickup means to count the output pulses of said first fixed frequency oscillator so as to produce an output signal when the counted content of said counter reaches a predetermined number, an up-down counter adapted to be actuated in response to the output signal from said first counter to count up the output pulses from said first fixed frequency oscillator and then count down in response to the next rotational angle signal with the output pulses of said second fixed frequency oscillator from the number of said up counts, a comparator circuit for producing an output signal when the content of said counter reaches a predetermined value when said counter is effecting count-down operation, and an ignition circuit adapted to be actuated in response to the output signal from said comparator circuit.

4. An ignition apparatus for an internal combustion engine comprising, in combination:
first means, responsive to the rotational speed of an engine, for generating a first signal for each rotational angle of the engine corresponding to a prescribed rotational angle;
second means, coupled to said first means, for generating a second signal delayed in time by a period of time starting with the instant of the generation of said first signal;
third means, coupled to said second means, for generating a third signal representative of the product of the length of time elapsed beginning with the instant of the generation of said second signal until the generation of the next first signal by said first means and a first predetermined coefficient, and for generating a fourth signal representative of the product of the length of time elapsed beginning with the instant of the generation of said next first signal independent of the speed of rotation of the engine and a second predetermined ccoefficient;
fourth means, coupled to said third means, for generating an ignition timing signal when the level of said fourth signal reaches a predetermined value, said ignition timing signal being applied to a primary coil circuit of an ignition circuit for said engine, so that electromagnetic induction is caused in the primary coil of said primary coil circuit to generate high voltage ignition energy in a secondary coil of said ignition circuit.

5. An ignition apparatus according to claim 4, wherein said fourth means includes
a comparator circuit for comparing the level of said fourth signal with said predetermined value and for generating an output signal when the level of said fourth signal reaches said predetermined value, and
a delay circuit, coupled to the output of said comparator, for generating a signal having a preselected duration for a period of time beginning with the instant of generation of the output signal of said comparator circuit, the signal generated by said delay circuit being applied to said primary coil circuit as said ignition timing signal.

6. An ignition apparatus according to claim 4, wherein said fourth means comprises a comparator circuit for comparing the level of said fourth signal with said predetermined value and for generating an output signal, as said ingnition timing signal, when the level of said fourth signal reaches said predetermined value.

7. An ignition apparatus according to claim 4, wherein said second means comprises a first delay circuit for generating said second signal subsequent to a time delay period corresponding to said period of time delay starting with the instant of generation of said first signal.

8. An ignition apparatus according to claim 4, wherein said second means comprises
a first delay circuit for generating a first delayed signal subsequent to a first preselected period of time starting with the instant of generation of said first signal, and
a second delay circuit, coupled to said first delay circuit, for generating a second delay signal, as said second signal, subsequent to a variable period of time starting with the instant of generation of said first delayed signal, the total of said first preselected period and said variable period corresponding to said period of the time delay of said second signal.

9. An ignition apparatus according to claim 8, wherein said fourth means includes
a comparator circuit for comparing the level of said fourth signal with said predetermined value and for generating an output signal when the level of said fourth signal reaches said predetermined value, and
a third delay circuit, coupled to the output of said comparator circuit, for generating a signal, as said ignition timing signal, having a variable duration beginning with the instant of generation of the output signal of said comparator circuit.

10. An ignition apparatus according to claim 5, wherein said ignition circuit is of the capacitor discharge type having a capacitor and a charging circuit therefor and includes a switch coupled to said primary coil, said switch being closed in response to said ignition timing signal being applied thereto, to discharge said capacitor through said primary coil.

11. An ignition apparatus according to claim 5, wherein said ignition circuit is of the induction type, and includes a switch and a battery power supply coupled to said primary coil, said ignition timing signal being applied to said switch to open said switch.

12. An ignition apparatus for an internal combustion engine comprising, in combination:
first means, responsive to the rotational speed of an engine, for generating a first signal for each rotational angle of the engine corresponding to a first portion of a prescribed rotational angle and a second signal subsequent to said first signal, for each rotational angle of the engine corresponding to a second portion of said prescribed rotational angle;
second means, coupled to said first means, for generating a third signal delayed in time by a period of time starting with the instant of the generation of said first signal;
third means, coupled to said first and second means, for generating a fourth signal representative of the product of the length of time elapsed beginning with the instant of the generation of said third signal by said second means until the generation of said second signal by said first means and a first predetermined coefficient, and for generating a fifth signal representative of the product of the length of time elapsed beginning with the instant of the generation of said second signal and second predetermined coefficient;

fourth means, coupled to said third means, for generating an ignition timing signal when the level of said fifth signal reaches a predetermined value, said ignition timing signal being applied to a primary coil of an ignition circuit for said engine, so that electromagnetic induction is caused in said primary coil to generate high voltage ignition energy in a secondary coil of said ignition circuit.

13. An ignition apparatus according to claim 12, wherein the time width of said first signal is dependent upon the rotational speed of the engine.

14. An ignition apparatus for an internal combustion engine comprising, in combination:

pickup means for generating one rotational angle signal for one ignition cycle of an internal combustion engine, a monostable multivibrator coupled to said pickup means and energized for a predetermined period of time in response to the rotational angle signal, a capacitor, coupled to said monostable multivibrator, and adapted to begin to be charged with a constant current immediately when said monostable multivibrator is de-energized and to begin to discharge with a constant current immediately when the next rotational angle signal is produced from said pickup means, a constant current charging circuit for charging said capacitor, a constant current discharging current for discharging said capacitor, a comparator circuit, coupled to said capacitor, for comparing a voltage across said capacitor with a predetermined reference voltage during the discharge of said capacitor, so as to generate an output signal when the voltage across said capacitor coincides with said reference voltage, and an ignition circuit, coupled to said comparator circuit, and adapted to be actuated in response to the signal produced by said comparator circuit.

15. An ignition apparatus for an internal combustion engine comprising:

pickup means for generating a pair of rotational angle signals for each ignition cycle of an internal combustion engine;

a monostable multivibrator coupled to said pickup means and being energized for a predetermined period of time in response to a rotational angle signal;

a capacitor, coupled to said monostable multivibrator, and adapted to begin to be charged with a constant current immediately when said monostable multivibrator is de-energized and to begin to discharge with a constant current immediately when the next rotational angle signal is produced from said pickup means;

a constant current charging circuit for charging said capacitor in response to a first one of said pair of rotational angle signals, a constant current discharging circuit for discharging said capacitor in response to the next one of said pair of rotational angle signals;

a comparator circuit, coupled to said capacitor, for comparing a voltage across said capacitor with a predetermined reference voltage during the discharge of said capacitor, so as to generate an output signal when the voltage across said capacitor coincides with said reference voltage; and an ignition circuit, coupled to said comparator circuit, and adapted to be actuated in response to the signal produced by said comparator circuit.

16. An ignition apparatus for an internal combustion engine comprising, in combination:

pickup means for generating one rotational angle signal for each ignition cycle of an internal combustion engine;

first and second fixed frequency oscillators;

a first counter actuated in response to the output signal from said pickup means and coupled to said first fixed frequency oscillator to count the output pulses of said first fixed frequency oscillator, so as to produce an output signal when the counted contents of said counter reach a predetermined number;

an up-down counter adapted to be actuated in response to the output signal from said first counter to count up the output pulses from said first fixed frequency oscillator and then count down, in response to the next rotational angle signal with the output pulses of said second fixed frequency oscillator, from the number of said up counts;

a comparator circuit, coupled to said up-down counter, for producing an output signal upon the contents of said counter reaching a predetermined value while said counter is effecting count-down operation; and an ignition circuit adapted to be actuated in response to the output signal from said comparator circuit.

17. An ignition apparatus for an internal combustion engine comprising, in combination:

pickup means for generating a rotational angle signal with a width varying with the rotational speed of an engine;

first and second fixed frequency oscillators;

an up-down counter adapted to be actuated at the rising time of the output of said pickup means, to count up to the output pulses from said first fixed frequency oscillator, and then count down, from the up count, in response to output pulses of said second fixed frequency oscillator from the point of the falling time of the output signal from said pickup means;

a comparator, coupled to said up-down counter, for producing an output signal upon the contents of said counter reaching a predetermined value while said counter is effecting a count-down operation; and an ignition circuit adapted to be actuated in response to the output signal from said comparator circuit.

18. An ignition apparatus according to claim 13, wherein the time width of said second signal is dependent upon the rotational speed of the engine.

19. An ignition apparatus according to claim 18, wherein said second means includes a first variable time interval signal generator circuit for generating a first timing signal, the width of which is variable in inverse proportion to the magnitude of the voltage of said battery power supply and corresponds to the period of time delay of said third signal.

20. An ignition apparatus according to claim 19, wherein said fourth means comprises a second variable time interval signal generator circuit for generating a second timing signal as said ignition timing signal, the width of which is variable in inverse proportion to the magnitude of the voltage of said battery power supply and upon said fifth signal reaching said predetermined value, said battery power supply being disconnected from said primary coil after the lapse of a given period of time corresponding to the width of said second timing signal.

* * * * *